L. DE FOREST.
OSCILLION.
APPLICATION FILED JUNE 16, 1916.
1,437,498.
Patented Dec. 5, 1922.
2 SHEETS—SHEET 2.
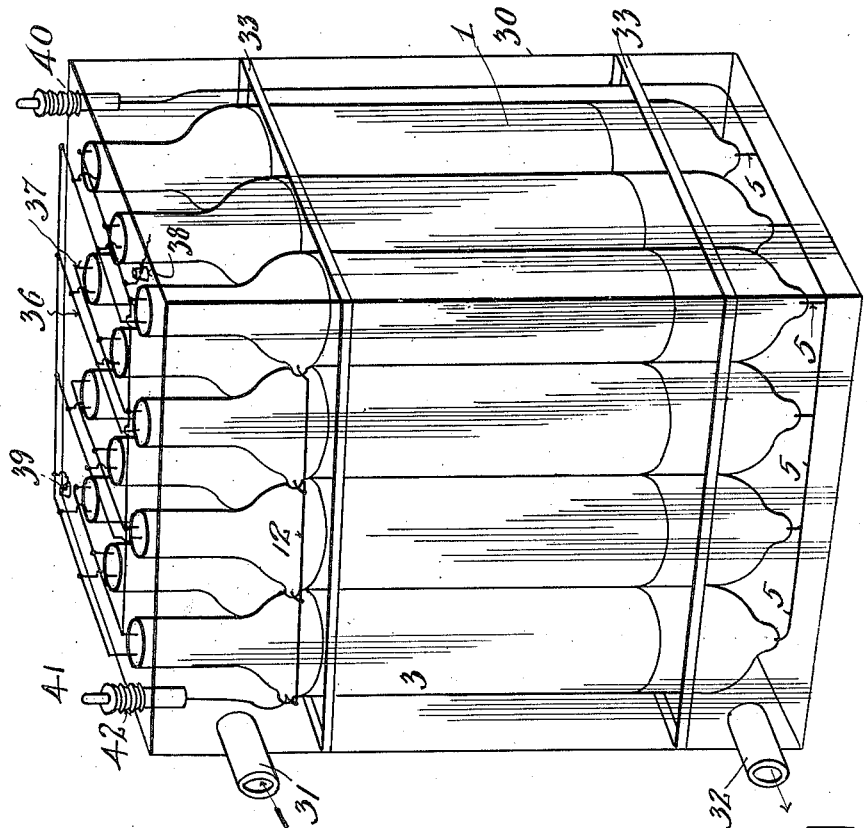
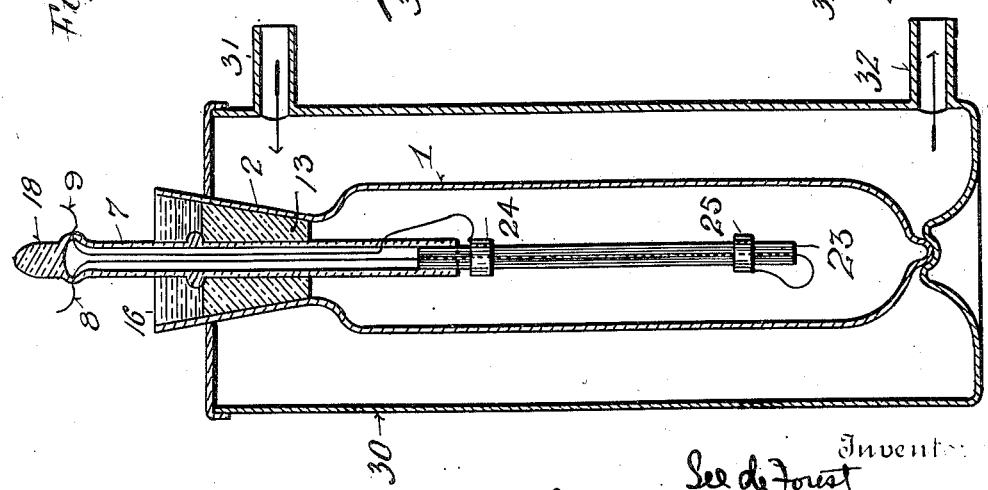
Inventor
Lee de Forest
By his Attorney
Samuel E. Darby Patented Dec. 5, 1922.

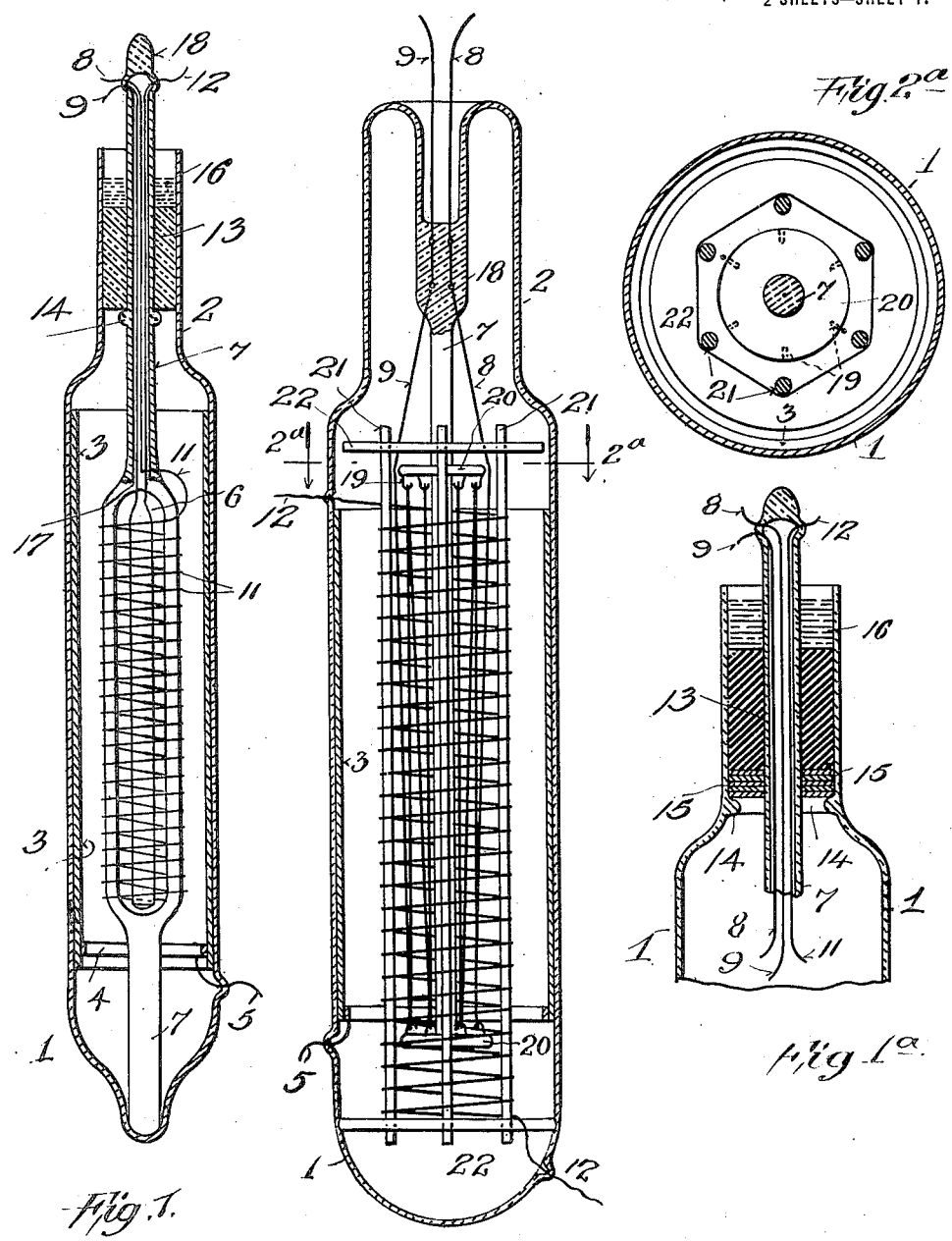

1,437,498

UNITED STATES PATENT OFFICE.

LEE DE FOREST, OF NEW YORK, N. Y., ASSIGNOR TO DE FOREST RADIO TELEPHONE AND TELEGRAPH COMPANY, OF NEW YORK, N. Y., A CORPORATION OF DELAWARE.

OSCILLION.

Application filed June 16, 1916. Serial No. 104,075.

*To all whom it may concern:*

Be it known that I, LEE DE FOREST, a citizen of the United States, residing at New York, in the county of Bronx and State of New York, have made a certain new and useful Invention in Oscillions, of which the following is a specification.

This invention relates to a structure of vessel containing electrodes sealed therein for use in connection with electrical signaling systems, and known in the art as oscillions.

The object of the invention is to provide a structure of oscillion which is simple and efficient and which has various advantages over the present types of oscillions.

Further objects of the invention will appear more fully hereinafter.

The invention consists substantially in the construction, combination, location and relative arrangement of parts all as will be more fully hereinafter set forth, as shown by the accompanying drawing, and finally pointed out in the appended claims.

Referring to the drawing:—

Fig. 1 is a view in central vertical section of an oscillion embodying my invention.

Fig. 1ª is a broken similar view of a modified construction.

Fig. 2 is a similar view of a further modification.

Fig. 2ª is a view in section taken on the line 2ª—2ª, Fig. 1, and looking in the direction of the arrows.

Fig. 3 is a sectional view of a further modified structure embodying my invention.

Fig. 4 is a view in perspective of a battery of oscillions and embodying my invention.

The same part is designated by the same reference numeral wherever it occurs throughout the several views.

In accordance with my invention I provide a glass vessel containing the usual three electrodes, the filament or glower, the grid and the plate or wing, the vessel being designated generally by reference numeral 1. The vessel 1 is preferably tubular in form and constricted at one end to form a neck 2. In Fig. 1 the neck 2 is open, as indicated. The plate or wing element 3 is preferably in the form of a cylinder, and is positioned close to the wall of the vessel, or, preferably, plated directly on the wall of the vessel, and may be of any desired suitable material such as silver, platinum, tungsten or the like. Fitting in close contact with the plate is a band of tungsten or nickel or the like, indicated at 4, to which is connected a lead wire 5, sealed through the wall of the vessel as shown. The filament or glower electrode 6, which is preferably carbon, tungsten or oxide-coated platinum, is as shown, in the form of a loop or "hair-pin," anchored at its lower end in a glass frame 7. The glass frame 7 is in the form of a glass rod which rests at its lower end against the bottom of the vessel. Intermediate its ends, the frame is formed with yoke arms which form a space between them, in which space the filament 6 extends. Above the yoke portion of the glass frame or rod the rod is hollow, and the respective leads 8, 9, of the filament extend upwardly in the hollow rod and are sealed through the wall thereof, as shown. The glass frame, or rather the yoke portion thereof also carries the grid element 11, which grid is wound spirally or otherwise around the frame, thereby surrounding the filament 6. The lead to the grid element passes through the hollow upper portion of the rod and is sealed through the same as at 12.

The hollow portion of the rod 7 extends through a stopper or cork 13, preferably of ground glass shown in Fig. 1, or of rubber, as shown in Fig. 1ª. If the neck of the vessel 1 is straight and cylindrical, as in Figs. 1, and 1ª, a cylindrical flange 14, may be blown on the inside of the neck to prevent the cork or stopper 13 from being sucked into the flask or vessel when the same is exhausted of air. The flange 14 may be carried by the rod 7 as shown in Fig. 1. When the cork or stopper 13 is of rubber, I prefer to place at its bottom end, a few washers of mica, or other suitable material, as at 15, to protect the rubber from the heat of the filament electrode, when the oscillion is used.

Above the cork or stopper 13, is a seal 16, of any suitable material such as mercury, shellac, wax, or the like, to render the cork or stopper perfectly airtight. An opening 17 in the glass rod or stem 7, permits the vessel to be exhausted of air through the rod, and thereupon the rod is sealed in the glass blowers' flame as at 18.

In Fig. 2, a somewhat different structure of filament and grid is shown, and also in place of a cork or stopper, the vessel 1 is sealed directly to the rod or stem 7 carrying the filament. In this arrangement, the filament 8, 9, is carried on molybdenum hooks 19 sealed into glass flanges 20 secured to or forming part of the stem 7, the filament being carried back and forth over said hooks, as in the usual metal filament lamp constructed. The filament leads 8, 9, are brought out through the seal of the glass rod and vessel, as shown at 18. The grid, in this arrangement is wound around a frame comprising a plurality of stems 21, preferably of glass, quartz, metal or the like. I prefer to fasten these grid supporting stems 21, through holes in two metal disks or rings 22, at top and bottom of the vessel. The grid lead or leads are shown sealed through the wall of the flask at 12, and the wing or plate lead at 5, in the same manner as in Fig. 1.

In Fig. 3, I have illustrated a modified type of glower or filament. In this arrangement I provide a rod or thin tube 23, which is platinized or plated with a thin coat of platinum, which in turn is coated with a coat of oxide, for example, a mixture of calcium and boron oxide, or sulphate. This tube is carried by the rod 7, as shown. Two bands of thin platinum 24, 25, are secured to the tube 23, at the top and bottom thereof making close contact therewith. The filament leads 8 and 9, are secured to these two bands, and are brought up through the supporting stem 7, and sealed through the same as shown. The vessel 1 may be exhausted of air through the stem 7, and the same then sealed at 18 as hereinbefore described. In this figure, I have omitted the details of the grid and plate elements, as it is obvious that either the arrangement of Figs. 1 or 2 may be used in connection therewith.

I have found that a glower electrode of this construction is a powerful electron emitter, and has practically indefinite length of life. I have found that this type oscillion, eighteen inches in length and two inches in diameter, and the grid and plate elements shown in Fig. 2, will generate upwards of one kilowatt high frequency energy when connected with such oscillating and supply circuits used in modern radio work, and form an exceedingly simple form of high frequency generator.

In this arrangement I have shown the vessel 1 with a converging neck 2, with the stopper or cork 13 of similar shape to fit therein.

I have found it advantageous in high power oscillions to keep the plate electrode 3 as cool as possible, and consequently in all of the structures shown this electrode is in intimate contact with the glass wall of the vessel or plated directly thereon. If desired, and preferably, the entire vessel up to the neck portion thereof is immersed in a tank 30, containing oil, water, or other suitable or desirable heat dissipating medium. In Fig. 3, I show a tank, in this instance, of metal provided with inlet and outlet connections 31, 32, whereby the cooling medium may be kept in circulation, for example, by means of a pump.

In Fig. 4, I show a battery of oscillions, such, for example, as that shown in Fig. 2, mounted in a common tank 30, in this instance of iron, provided with inlet and outlet connections 31, 32, for cooling medium. The oscillions are supported by suitable plates 33, and the filament elements are connected in parallel to each other through connections 36, 37 and thence to common binding posts 38, 39, respectively. The plate leads 5 are brought out from the lower end of the tubes to a common insulated terminal 40. Similarly, the grid leads 12 are brought out to a common terminal 41, insulated through the porcelain bushing 42.

While I have shown and described various specific structures embodying the principles of my invention, I wish it to be understood that many other arrangements and various changes in detail will readily occur to those skilled in the art without departing from the broad scope of my invention as defined in the claims. Therefore, what I claim as new and useful, and of my own invention, and desire to secure by Letters Patent, is—

1. An oscillion comprising a container, an insulating frame having a portion extending into the interior of the container and a portion exterior of the container, an electrode carried by the interior portion of said frame, an electrode wound around the interior portion of said frame but out of contact with said first mentioned electrode, and a third electrode disposed in the interior of and supported by said container.

2. An oscillion comprising a container, an insulating frame having a portion extending into the interior of the container and a portion exterior of the container, a glower electrode carried by the interior portion of said frame, a grid electrode wound around the interior portion of said frame but out of contact with said glower electrode, and a plate electrode arranged inside of and supported by said container.

3. An oscillion comprising a container having therein cathode and anode electrodes, one of said electrodes being in contact with the wall of said container, a stopper for said container, the leads of said cathode extending through said stopper, means for exhausting said container of air through said stopper, and means for sealing said stopper to render the same air-tight.

4. An oscillion comprising a container, a frame located therein and having a hollow portion extending to the exterior of the same, an electrode supported by said frame, and an electrode wound around said frame and encompassing but out of contact with said first mentioned electrode and a third electrode supported by said container and out of contact with the other two electrodes, and means for exhausting air from said container through the hollow portion of said frame.

In testimony whereof I have hereunto set my hand in the presence of the subscribing witnesses, on this 5th day of June A. D., 1916.

LEE DE FOREST.

Witnesses:
CHARLES V. LOGWOOD,
EHUAN B. MYERS.